Patented Aug. 7, 1951

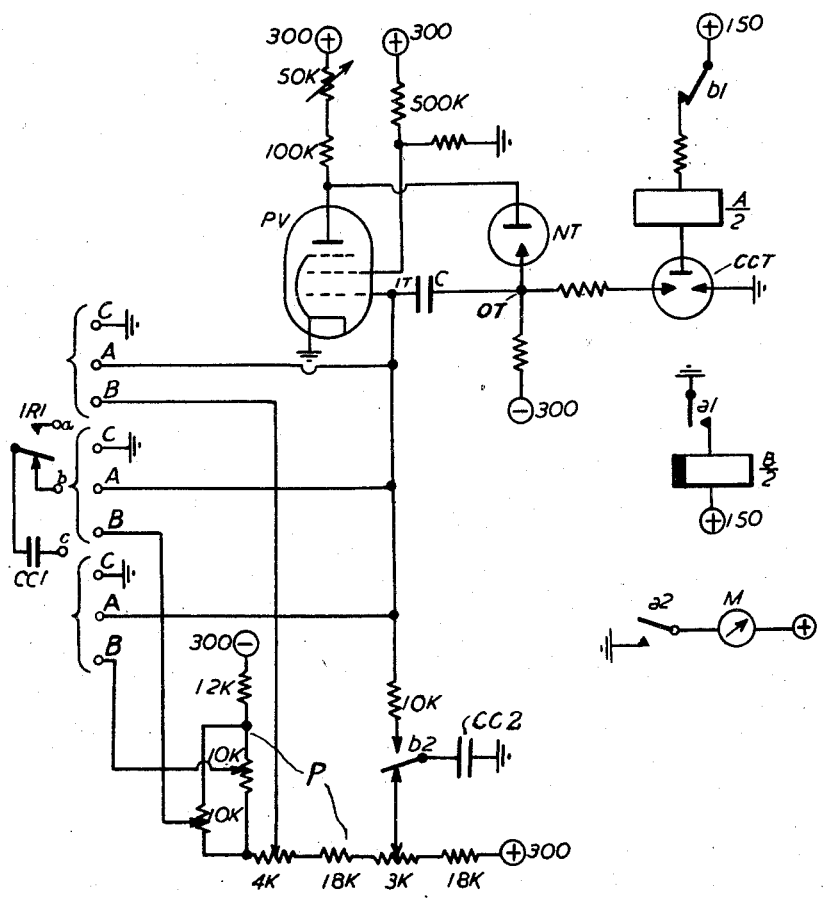

2,562,931

UNITED STATES PATENT OFFICE 2,562,931

MEASURING DEVICE

Eric Malcolm Swift McWhirter and Roland Harris Dunn, London, England, assignors to International Standard Electric Corporation, New York, N. Y.

Application January 2, 1947, Serial No. 719,771
In Great Britain January 21, 1946

4 Claims. (Cl. 235—92)

This invention relates to measuring devices, and has for its object a measuring device which is capable of measuring over an indeterminate period.

One feature of the invention comprises a measuring device adapted to measure by subtracting a predetermined quantity at intervals from a recorded quantity.

Another feature of the invention comprises a measuring device adapted to measure by subtracting a predetermined known quantity from a quantity integrated from a number of received quantities whereby measurement can take place in an integrator of limited capacity over a limitless period.

A further feature of the invention comprises a continuously-operable electrical measuring circuit comprising a condenser charged under control of a factor to be measured and discharged by measuring means.

The invention will be particularly described with reference to one of its many possible embodiments illustrated in the accompanying drawing which shows an electrical circuit for integrating the amount of coal fed to the automatically-fed boilers of an electricity generating station, or for integrating any other desired quantities which vary in size and may be received at random intervals.

The circuit shown is for measuring a number of similar operations, each having a constant value, but differing in value one from another. Such a problem arises when it is desired to integrate the total quantity of coal fed by the automatic stokers for the boilers of an electricity generating station, the stokers varying in capacity.

Each time an automatic stoker operates it causes a short change-over of contacts such as IRI. The back contacts of each contact IRI complete a charging circuit for an associated condenser CCI between earth and a tapping on a potentiometer P, connected between negative and positive terminals of a source of D. C. potential.

The condenser characteristics and the tappings on the potentiometer are chosen so that the condenser charges are proportional to the corresponding stoker capacities.

When an automatic stoker operates, its contacts IRI change over and the corresponding condenser CCI is connected to input terminal IT of a condenser C. The grid of a pentode valve PV is connected to point IT and has its anode circuit connected via a neon cold cathode tube NT to the output terminal OT of condenser C, which terminal is also connected to negative potential of the same value (300 volts) as the valve feed.

Terminal OT is also connected to the firing electrode of a cold cathode tube CCT adapted to fire at a predetermined potential. The discharge circuit of CCT includes a telephone-type relay $$\frac{A}{2}$$

which interacts with a slow-release relay $$\frac{B}{2}$$

Each time any contact IRI operates, the connection of a condenser CCI to point IT results in an increment of positive potential at OT proportional to the furnace charge which has been stoked. The drop of potential across NT, which is discharging between 300 volts negative via 2 megohms and the positive feed circuit to the anode of PV, will remain constant so that the increment of positive potential is fully transferred to OT.

When the potential at OT reaches the value at which CCT fires, the relay $$\frac{A}{2}$$

is operated, followed by relay $$\frac{B}{2}$$

which releases $$\frac{A}{2}$$

and changes over its contacts $b2$ during its slow release.

Contacts $b2$ control the connection of another condenser CC2 to a positive tapping on potentiometer P and to terminal IT. The connection of positive potential from CC2 to point IT causes a decrement of positive potential at point OT so that, the circuit of CCT having been opened, it will not again fire.

The circuit arrangements are such that the decrement of potential at OT due to the connection of condenser CC2 is equal to the total increment of potential at OT from neutral condition, due to successive connections of condensers CCI to IT, which caused CCT to fire.

Each operation of relay $$\frac{A}{2}$$

operates a counter M via $a2$, so that counter M records the total amount of coal stoked.

As the potential at OT is periodically reduced the circuit is capable of continuous operation without PV becoming overloaded.

The range of potential over which condenser C is charged is divided between positive and negative directions of charge to a more or less equal extent. This minimizes any inaccuracy of result arising from internal leakage of the condenser.

As the condensers CC1 and CC2 are charged from a common source, there is no need to have a stabilized source of potential, as any change in potential will affect all charging circuits to a comparable degree.

Further, although the potential at which CC1 operates may vary, resulting in differences between the successive increments and decrements of potential on OT, these will tend to average themselves out over a period. If, however, greater accuracy is required, the cold cathode tube may be replaced by a triode or pentode trigger circuit.

What is claimed is:

1. Apparatus for registering the sum of separate sources of impulses comprising a source of two polarity charging potential, a condenser for each source of impulses, each condenser adapted to be charged from said source in one direction, a main condenser of greater capacity than any of said first-named condensers, a re-setting condenser of equivalent capacity to said main condenser, said re-setting condenser adapted to be charged from said source in the other direction, means for transferring the charge from said first-named condensers to said main condenser, means coupled to said main condenser responsive to a predetermined state of charge of said main condenser to register the sum of impulses from said first named condensers, said re-setting condenser adapted to be coupled to said main condenser under control of said last-named means thereby to restore said main condenser to a neutral state of charge.

2. Apparatus for registering the sum of separate sources of impulses as claimed in claim 1, and in which said first-named condensers and said re-setting condenser are charged from different tappings from said source.

3. Apparatus for registering the sum of separate sources of impulses as claimed in claim 1, wherein said means coupled to said main condenser responsive to a pre-determined state of charge of said main condenser comprises a discharge tube adapted to conduct when said main condenser has attained a predetermined state of charge and indicating means connected in the discharge path of said discharge tube adapted to give an indication upon each conduction of said discharge tube.

4. Apparatus for registering the sum of separate sources of impulses as claimed in claim 3, further comprising voltage regulation means in shunt with said main condenser and said discharge tube, said voltage regulation means adapted to prevent conduction of said discharge tube until said main condenser has attained a predetermined state of charge.

ERIC MALCOLM SWIFT McWHIRTER.
ROLAND HARRIS DUNN.

REFERENCES CITED

The following references are of record in the file of this patent:

UNITED STATES PATENTS

| Number | Name | Date |
| --- | --- | --- |
| 1,762,712 | Charlton | June 10, 1930 |
| 1,995,890 | Lord | Mar. 26, 1935 |
| 2,078,792 | Fitzgerald | Apr. 27, 1937 |
| 2,176,742 | La Pierre | Oct. 17, 1939 |
| 2,329,048 | Hullegard | Sept. 7, 1943 |
| 2,392,632 | Berry | Jan. 8, 1946 |
| 2,415,567 | Schoenfeld | Feb. 11, 1947 |